US008268016B2

(12) United States Patent
Batchelor et al.

(10) Patent No.: US 8,268,016 B2

(45) Date of Patent: Sep. 18, 2012

(54) LAUNDRY TREATMENT COMPOSITIONS

(75) Inventors: Stephen Norman Batchelor, Wirral (GB); Jayne Michelle Bird, Wirral (GB)

(73) Assignee: The Sun Products Corporation, Wilton, CT (US)

(*) Notice: Subject to any disclaimer, the term of this patent is extended or adjusted under 35 U.S.C. 154(b) by 655 days.

(21) Appl. No.: 11/663,578

(22) PCT Filed: Sep. 9, 2005

(86) PCT No.: PCT/EP2005/009846

§ 371 (c)(1),
(2), (4) Date: Mar. 23, 2007

(87) PCT Pub. No.: WO2006/045375

PCT Pub. Date: May 4, 2006

(65) Prior Publication Data

US 2009/0223003 A1 Sep. 10, 2009

(30) Foreign Application Priority Data

Sep. 23, 2004 (GB) .................................. 0421147.0
Apr. 27, 2005 (GB) .................................. 0508484.3

(51) Int. Cl.
*C09B 67/00* (2006.01)
*D06L 3/12* (2006.01)

(52) U.S. Cl. .................................... 8/525; 8/648; 8/441

(58) Field of Classification Search ............. 8/657, 662, 8/663, 636
See application file for complete search history.

(56) References Cited

U.S. PATENT DOCUMENTS

| | | | | |
|---|---|---|---|---|
| 3,172,723 | A | 3/1965 | Hay et al. | 8/130.1 |
| 3,186,155 | A | 6/1965 | Breen et al. | 57/140 |
| 3,215,486 | A | 11/1965 | Hada et al. | 8/74 |
| 3,415,904 | A | 12/1968 | Taniguchi et al. | 260/897 |
| 3,575,866 | A | 4/1971 | Strobel et al. | |
| 3,584,991 | A | 6/1971 | Sturkey | 8/24 |
| 3,748,093 | A | 7/1973 | Gangwisch et al. | 8/137 |
| 3,755,201 | A * | 8/1973 | Trimmer et al. | 510/324 |
| 3,758,335 | A | 9/1973 | Bergman et al. | 117/136 |
| 3,841,831 | A | 10/1974 | Miller | |
| 3,941,791 | A | 3/1976 | Hell et al. | |
| 3,958,928 | A | 5/1976 | Lala | |
| 4,077,765 | A | 3/1978 | Rosati | |
| 4,091,034 | A | 5/1978 | Kuhn | |
| 4,110,238 | A | 8/1978 | Lala | |
| 4,167,628 | A | 9/1979 | Kormany | |
| 4,196,103 | A | 4/1980 | Richter | |
| 4,197,087 | A | 4/1980 | Ami et al. | 8/62 |
| 4,270,236 | A | 6/1981 | Zurbuchen et al. | 8/159 |
| 4,283,197 | A | 8/1981 | Schürings et al. | 8/638 |
| 4,454,146 | A | 6/1984 | Borovian | 424/270 |
| 4,460,374 | A * | 7/1984 | Abel et al. | 8/501 |
| 4,494,957 | A * | 1/1985 | Niwa et al. | 8/639 |
| 4,601,725 | A | 7/1986 | Keller et al. | |
| 4,602,916 | A | 7/1986 | Wilson | 8/580 |
| 4,728,453 | A | 3/1988 | Choy | 252/91 |
| 4,800,037 | A | 1/1989 | Mazzola | 252/109 |
| 4,886,517 | A | 12/1989 | Bugaut et al. | |
| 4,908,040 | A | 3/1990 | Naef et al. | |
| 5,049,311 | A | 9/1991 | Rasheed et al. | 252/389.52 |
| 5,998,351 | A | 12/1999 | Brouwer et al. | |
| 6,214,963 | B1 * | 4/2001 | Noguchi et al. | 528/71 |
| 6,521,581 | B1 | 2/2003 | Hsu et al. | 510/297 |
| 6,712,890 | B2 | 3/2004 | Hadjisoteriou et al. | |
| 7,235,518 | B2 | 6/2007 | Brush et al. | |
| 2002/0062763 | A1 * | 5/2002 | Macholdt et al. | 106/31.49 |
| 2002/0151235 | A1 | 10/2002 | Bartl et al. | 442/60 |
| 2005/0227890 | A1 * | 10/2005 | Van Dijk et al. | 510/276 |
| 2009/0217467 | A1 | 9/2009 | Batchelor et al. | |
| 2010/0093591 | A1 | 4/2010 | Lant | |
| 2010/0115707 | A1 | 5/2010 | Batchelor et al. | |

FOREIGN PATENT DOCUMENTS

| | | |
|---|---|---|
| DE | 4224039 | 1/1993 |
| DE | 25 57 783 | 7/2007 |
| EP | 1 095 985 | 5/2001 |
| EP | 1 794 276 B1 | 4/2009 |
| GB | 1 419 125 | 12/1975 |
| GB | 2358404 A | 7/2001 |
| WO | 97/26315 | 7/1997 |
| WO | 99/67459 | 12/1999 |
| WO | 03/093565 | 11/2003 |
| WO | 2004/044057 | 5/2004 |
| WO | 2004/072217 | 8/2004 |
| WO | WO 2005/068596 A1 | 7/2005 |
| WO | WO2006/004870 | 1/2006 |
| WO | 2006/032327 | 3/2006 |
| WO | 2006/032397 | 3/2006 |
| WO | 2006/045375 | 5/2006 |
| WO | WO2011/025623 A1 | 3/2011 |

OTHER PUBLICATIONS

GB Search Report in a GB application GB 0421145.4.
PCT International Search Report in a PCT application PCT/EP2005/008629.
Co-pending Application: Applicant: Batchelor; U.S. Appl. No. 11/663,575.
Co-pending Application: Applicant: Batchelor et al.; U.S. Appl. No. 11/663,576.
PCT International Search Report in a PCT application PCT/EP 2005/009846.
GB Search Report in a GB application GB0508484.3.
Derwent Abstract of DE 4224039 published Jan. 28, 1993.
PCT International Search Report in a PCT application PCT/EP2005/009884.
Derwent Abstract of DE 25 67 783 published Jul. 7, 1997.
Derwent Abstract of JP 01 180816, published Jul. 18, 1989.
GB Search Report in a GB application GB0508486.8.
Hayhurst, R. and Smith, K., "Instrumental evaluation of whiteness," *Journal of the Society of Dyers and Colourists* 111: 263-266, Society of Dyers and Colourists, Bradford, Yorkshire, United Kingdom (Sep. 1995).

(Continued)

*Primary Examiner* — Harold Pyon
*Assistant Examiner* — Katie L Hammer
(74) *Attorney, Agent, or Firm* — Sterne, Kessler, Goldstein & Fox, PLLC

(57) ABSTRACT

The present invention provides a treatment composition comprising a hydrophobic dye.

26 Claims, No Drawings

OTHER PUBLICATIONS

Smulders, E., et al., Laundry Detergents, 2007, Wiley-VCH Verlag GmbH & KGaA, Wertheim, Germany.
Krik-Othmer, "Dyes and Dye Intermediates," *Encyclopedia of Chemical Technology* 8:542-554, John Wiley & Sons, United States (1993).
Laucius, J.F., "Disperse Azo Dyes," in The Chemistry of Synthetic Dyes and Pigments, edited by H.A. Lubs, pp. 167-174, American Chemical Society, United States (1955).
"Industrial Dyes: Chemistry, Properties, Applications," pp. 134-138, edited by K. Hunger, Wiley-VCH Verlag GmbH & Co., Germany (2003).
"Notice of Opposition to a European patent," Patent Opposed: EP 1794276 B1, Proprietor of the patent: Unilever PLC; and Opponent: The Procter & Gamble Company, Jan. 27, 2010.
"Facts and Arguments" for European Patent Application No. 05787403.4/1794276 in the name of Unilever PLC, et al. opposed by the Procter & Gamble Company, Jan. 28, 2010.
Statement of Patrick D. Moore, Ph.D. of Milliken & Company, Jan. 25, 2010, cited as "D4a" in NPL5 and submitted by The Procter & Gamble Company.
"EP 1 794 276 B1 in the name of Unilever PLC/NV Opposed by The Procter & Gamble Company Written Response of Patent Proprietor," Sep. 13, 2010.
Laucius, J.F. "Disperse Azo Dyes," pp. 107, 168-174, in The Chemistry of Synthetic Dyes and Pigments, Lubs, H.A., S. ed., Reinhold Publishing Company, New York, 1955).
Annen, O. et al., "Replacement of disperse anthraquinone dyes," Review of Progress in Coloration 17: 72-85 (1987).
Dunnett, C.W., "A Multiple Comparison Procedure for Comparing Several Treatmetns with a Control," Journal of the American Statistical Association 50: 1096-1121 (1995).
Griesser, R., "Assessment of Whiteness and Tint of Fluorescent Substrates with Good Insterinstrument Correlation," Color Research and Application 19: 446-460 (1994).
Leaver, A. T. et al., "Recent Advances in Disperse Dye Development and Applications," Textile Chemist and Colorist 24: 18-21 (1992).
"8-1 A Single Mean," pp. 254-255, in Introductory Statistics ($5^{th}$ ed.), Wonnacott, T.H. and Wonnacott, R. J. eds., John Wiley & Sons, Inc., Canada (1960).
Industrial Dyes, pp. 36, 139 and 295-297, Hunger, K. ed., Wiley-VCH (2003).
Organic Chemistry in Color, pp. 163, 223 and 241, Gordon, P.F. and Gregory, P., eds., Springer-Verlag, New York (1983).
Contents of Volume, Colour Index, $3^{rd}$ Edition, vol. 4, Society of Dyers and Colourists, England (1971).
Sudan Black Material Safety Data Sheet (2008).
Statutory Declaration of Barbara Kuzmak, dated Apr. 4, 2012, filed in EP1794276.

* cited by examiner

LAUNDRY TREATMENT COMPOSITIONS

TECHNICAL FIELD

The present invention relates to laundry treatment compositions that comprise a dye.

BACKGROUND OF THE INVENTION

Garments comprising polyester fibres are ubiquitous. Many garments are white but over the lifetime of these garments the whiteness is dulled reducing the aesthetic value of the garment. There is a need to maintain the white appearance of such garments such that the aesthetic value is retained as long as possible.

Bleach, fluorescers and shading agents are used in modern wash processes to maintain whiteness. The fluorescers and shading agents that are currently available, do not deposit on polyester fibres of garments to a significant degree. All fibres may be subjected to a bleaching process but over time such treatment can lead to the garment taking a yellow hue.

There is a need to provide technology that maintains and enhances the white appearance of polyester comprising garments.

SUMMARY OF THE INVENTION

Dyes disclosed herein are known to be used to dye textiles in industrial processes conducted at high temperatures together with high concentrations of dyes and dispersion agents. Surprisingly the dyes can be used to shade at low levels of dye and surfactant and at routine laundry temperatures. We have found that hydrophobic dyes are substantive to polyester fibres under normal domestic wash conditions. At low levels of dye a shading whiteness benefit is provided.

In one aspect the present invention provides a laundry treatment composition comprising between 0.0001 to 0.1 wt % of a hydrophobic dye selected from benzodifuranes, methine, triphenylmethanes, napthalimides, pyrazole, napthoquinone and mono-azo or di-azo dyes, and between 2 to 60 wt % of a surfactant. It is preferred that the dye is a mono-azo dye.

In another aspect the present invention provides a method of treating a textile, the method comprising the steps of: (i) treating a textile with an aqueous solution of the hydrophobic dye, the aqueous solution comprising from, 1 ppb to 6 ppm of the hydrophobic dye and from 0.2 g/L to 3 g/L of a surfactant; and, (ii) rinsing and drying the textile. It is preferred that the aqueous solution has an ionic strength from 0.001 to 0.5. It is preferred that the hydrophobic dye is present in the range 10 ppb to 200 ppb. In another aspect it is preferred that the aqueous solution also comprises from 1-ppb to 5 ppm one or more other dyes selected from cotton substantive shading dyes of group consisting of: hydrolysed reactive dye; acid dye; and direct dye.

A "unit dose" as used herein is a particular amount of the laundry treatment composition used for a type of wash, conditioning or requisite treatment step. The unit dose may be in the form of a defined volume of powder, granules or tablet or unit dose detergent liquid.

DETAILED DESCRIPTION OF THE INVENTION

Typical dye suppliers may be found in the colour index, and include Clariant, Dystar, Ciba & BASF.

Hydrophobic dyes are defined as organic compounds with a maximum extinction coefficient greater than 1000 L/mol/cm in the wavelength range of 400 to 750 nm and that are uncharged in aqueous solution at a pH in the range from 7 to 11. The hydrophobic dyes are devoid of polar solubilizing groups. In particular the hydrophobic dye does not contain any sulphonic acid, carboxylic acid, or quaternary ammonium groups. The dye chromophore is preferably selected from the group comprising: azo; methine, pyrazole napthoquinone, phthalocyanine; and, triphenylmethane chromophores. Most preferred are azo dye chromophores.

Many examples of hydrophobic dyes are found in the classes of solvent and disperse dyes.

Shading of white garments may be done with any colour depending on consumer preference. Blue and Violet are particularly preferred shades and consequently preferred dyes or mixtures of dyes are ones that give a blue or violet shade on white polyester.

It is preferred that the dye(s) have a peak absorption wavelength of from 550 nm to 650 nm, preferably from 570 nm to 630 nm. A combination of dyes may be used which together have the visual effect on the human eye as a single dye having a peak absorption wavelength on polyester of from 550 nm to 650 nm, preferably from 570 nm to 630 nm. This may be provide for example by mixing a red and green-blue dye to yield a blue or violet shade.

A wide range of suitable solvent and disperse dyes are available. However detailed toxicological studies have shown that a number of such dyes are possible carcinogens, such dyes are not preferred.

Preferred mono-azo dyes are of the form:

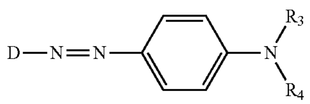

wherein R3 and R4 are optionally substituted C2 to C12 alkyl chains having optionally therein ether (—O—) or ester links, the chain being optionally substituted with —Cl, —Br, —CN, $—NO_2$, and $—SO_2CH_3$; and, D denotes an aromatic or hetroaromatic group. Preferably D is selected from the group consisting of: thiophenes, benzothiazoles and pyridones.

It is preferred that R3 is —CH2CH2R5 and R4 and is —CH2CH2R6 and R5 and R6 are independently selected from the group consisting of: H, —CN, —OH, —C6H5, —OCOR7 and —COOR7, and that R7 is independently selected from: aryl and alkyl. Preferred aryl are —C6H5 and C10H7.

The following is an example of a preferred class of mono-azo dyes:

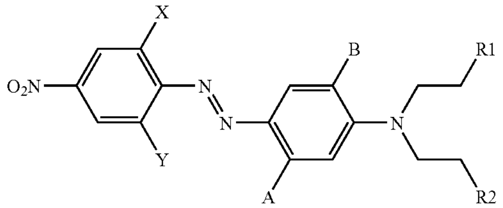

where X and Y are independently selected from the group consisting of: —H, —Cl, —Br, —CN, $—NO_2$, and $—SO_2CH_3$;

A is selected —H, $—CH_3$, —Cl, and —NHCOR;

B is selected —H, $—OCH_3$, $—OC_2H_5$, and —Cl;

$R^1$ and $R^2$ are independently selected from the group consisting of: —H, —CN, —OH, —OCOR, —COOR, -aryl; and R is C1-C8-alkyl.

The following are preferred azo dyes: Disperse blue 10, 11, 12, 21, 30, 33, 36, 38, 42, 43, 44, 47, 79, 79:1, 79:2, 79:3, 82, 85, 88, 90, 94, 96, 100, 101, 102, 106, 106:1, 121, 122, 124, 125, 128, 130, 133, 137, 138, 139, 142, 146, 148, 149, 165, 165:1, 165:2, 165:3, 171, 173, 174, 175, 177, 183, 187, 189, 193, 194, 200, 201, 202, 206, 207, 209, 210, 211, 212, 219, 220, 224, 225, 248, 252, 253, 254, 255, 256, 257, 258, 259, 260, 264, 265, 266, 267, 268, 269, 270, 278, 279, 281, 283, 284, 285, 286, 287, 290, 291, 294, 295, 301, 304, 313, 315, 316, 317:319, 321, 322, 324, 328, 330, 333, 335, 336, 337, 338, 339, 340, 341, 342, 343, 344, 345, 346, 351, 352, 353, 355, 356, 358, 360, 366, 367, 368, 369, 371, 373, 374, 375, 376 and 378, Disperse Violet 2, 3, 5, 6, 7, 9, 10, 12, 13, 16, 24, 25, 33, 39, 42, 43, 45, 48, 49, 50, 53, 54, 55, 58, 60, 63, 66, 69, 75, 76, 77, 82, 86, 88, 91, 92, 93, 93:1, 94, 95, 96, 97, 98, 99, 100, 102, 104, 106 or 107, Dianix violet cc, and dyes with CAS-No's 42783-06-2, 210758-04-6, 104366-25-8, 122063-39-2, 167940-11-6, 52239-04-0, 105076-77-5, 84425-43-4, and 87606-56-2.

The following are preferred non-azo dyes: Disperse Blue 250, 354, 364, Solvent Violet 8, solvent blue 43, solvent blue 57, Lumogen F Blau 650, and Lumogen F Violet 570.

It is preferred that the dye is fluorescent.

The composition may also comprise between 0.0001 to 0.1 wt % of one or more other dyes selected from cotton substantive shading dyes of group consisting of: hydrolysed reactive dye; acid dye; and direct dye.

Balance Carriers and Adjunct Ingredients

The laundry treatment composition in addition to the dye comprises the balance carriers and adjunct ingredients to 100 wt % of the composition.

These may be, for example, surfactants, builders, foam agents, anti-foam agents, solvents, fluorescers, bleaching agents, and enzymes. The use and amounts of these components are such that the composition performs depending upon economics, environmental factors and use of the composition.

The composition may comprise a surfactant and optionally other conventional detergent ingredients. The composition may also comprise an enzymatic detergent composition which comprises from 0.1 to 50 wt %, based on the total detergent composition, of one or more surfactants. This surfactant system may in turn comprise 0 to 95 wt % of one or more anionic surfactants and 5 to 100 wt % of one or more nonionic surfactants. The surfactant system may additionally contain amphoteric or zwitterionic detergent compounds, but this in not normally desired owing to their relatively high cost. The enzymatic detergent composition according to the invention will generally be used as a dilution in water of about 0.05 to 2 wt %.

It is preferred that the composition comprises between 2 to 60 wt % of a surfactant, most preferably 10 to 30 wt %. In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981.

Suitable nonionic detergent compounds which may be used include, in particular, the reaction products of compounds having a hydrophobic group and a reactive hydrogen atom, for example, aliphatic alcohols, acids, amides or alkyl phenols with alkylene Oxides, especially ethylene oxide either alone or with propylene oxide. Specific nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 40 EO. Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system that is a mixture of an alkali metal salt of a $C_{16}$ to $C_{18}$ primary alcohol sulphate together with a $C_{12}$ to $C_{15}$ primary alcohol 3 to 7 EO ethoxylate.

The nonionic detergent is preferably present in amounts greater than 10%, e.g. 25 to 90 wt % of the surfactant system. Anionic surfactants can be present for example in amounts in the range from about 5% to about 40 wt % of the surfactant system.

Cationic Compound

When the present invention is used as a fabric conditioner it needs to contain a cationic compound.

Most preferred are quaternary ammonium compounds.

It is advantageous if the quaternary ammonium compound is a quaternary ammonium compound having at least one $C_{12}$ to $C_{22}$ alkyl chain.

It is preferred if the quaternary ammonium compound has the following formula:

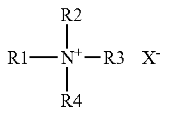

in which $R^1$ is a $C_{12}$ to $C_{22}$ alkyl or alkenyl chain; $R^2$, $R^3$ and $R^4$ are independently selected from $C_1$ to $C_4$ alkyl chains and $X^-$ is a compatible anion. A preferred compound of this type is the quaternary ammonium compound cetyl trimethyl quaternary ammonium bromide.

A second class of materials for use with the present invention are the quaternary ammonium of the above structure in which $R^1$ and $R^2$ are independently selected from $C_{12}$ to $C_{22}$ alkyl or alkenyl chain; $R^3$ and $R^4$ are independently selected from $C_1$ to $C_4$ alkyl chains and $X^-$ is a compatible anion.

A detergent composition according to claim 1 in which the ratio of (ii) cationic material to (iv) anionic surfactant is at least 2:1.

Other suitable quaternary ammonium compounds are disclosed in EP 0 239 910 (Procter and Gamble).

It is preferred if the ratio of cationic to nonionic surfactant is from 1:100 to 50:50, more preferably 1:50 to 20:50.

The cationic compound may be present from 0.02 wt % to 20 wt % of the total weight of the composition.

Preferably the cationic compound may be present from 0.05 wt % to 15 wt %, a more preferred composition range is from 0.2 wt % to 5 wt %, and most preferably the composition range is from 0.4 wt % to 2.5 wt % of the total weight of the composition.

If the product is a liquid it is preferred if the level of cationic surfactant is from 0.05 wt % to 10 wt % of the total weight of the composition. Preferably the cationic compound may be present from 0.2 wt % to 5 wt %, and most preferably from 0.4 wt % to 2.5 wt % of the total weight of the composition.

If the product is a solid it is preferred if the level of cationic surfactant is 0.05 wt % to 15 wt % of the total weight of the composition. A more preferred composition range is from 0.2 wt % to 10 wt %, and the most preferred composition range is from 0.9 wt % to 3.0 wt % of the total weight of the composition.

Bleaching Species

The laundry treatment composition may comprise bleaching species. The bleaching species, for example, may selected from perborate and percarbonate. These peroxyl species may be further enhanced by the use of an activator, for example, TAED or SNOBS. Alternatively or in addition to, a transition metal catalyst may used with the peroxyl species. A transition metal catalyst may also be used in the absence of peroxyl species where the bleaching is termed to be via atmospheric oxygen, see, for example WO02/48301. Photobleaches, including singlet oxygen photobleaches, may be used with the laundry treatment composition. A preferred photobleach is vitamin K3.

Fluorescent Agent

The laundry treatment composition most preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in laundry treatment composition is generally from 0.005 to 2 wt %, more preferably 0.01 to 0.1 wt %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d] trazole, disodium 4,4'-bis{[(4-anilino-6-(N methyl-N-2 hydroxyethyl)amino 1,3,5-triazin-2-yl)]amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis(2-sulfoslyryl)biphenyl.

EXAMPLES

Example 1

Approximately 1000 ppm solutions of the dyes listed in the table below, were made in ethanol.

A stock solution of 1.8 g/L of a base washing powder in water was created. The washing powder contained 18% NaLAS, 73% salts (silicate, sodium tri-poly-phosphate, sulphate, carbonate), 3% minors including perborate, fluorescer and enzymes, remainder impurities and water. The solution was divided into 100 ml aliquots and the solvent dyes added from the ethanol solutions to give 5.8 ppm solutions. 1 g of pure woven polyester fabric was added to each of the wash solutions and the solution then shaken for 30 minutes, rinsed and dried. From the colour of the fabric it was clear that dye had deposited to the fabric. To quantify this the colour was measured using a reflectance spectrometer and expresses as the deltaE value compared to a polyester washed analogously but without dye present.

The results are given below

| Dye | Dye-ppm in solution | deltaE |
|---|---|---|
| No dye (to indicate error level) | 0 | 0.2 |
| 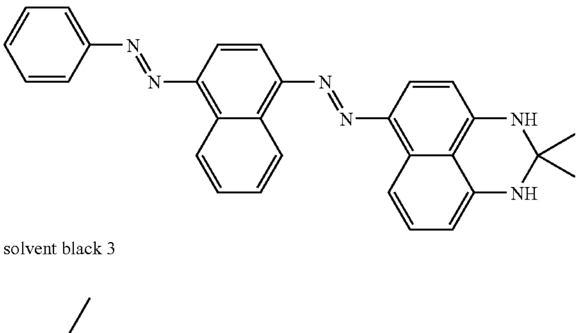 solvent black 3 | 5.7 | 5.0 |
| 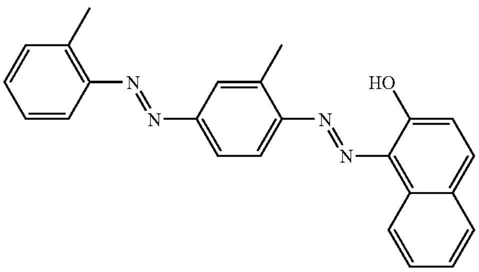 solvent red 24 | 5.8 | 10.6 |

-continued

| Dye | Dye-ppm in solution | deltaE |
|---|---|---|
| 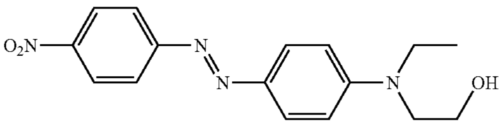 disperse red 1 | 5.8 | 10.9 |
| 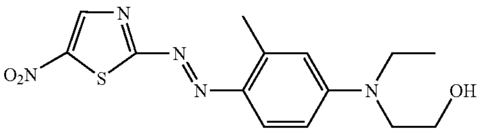 disperse blue 106 | 5.8 | 4.8 |

Example 2

50 ppm solutions of the dyes listed in the table below, were made in ethanol. Concentration refers to dyes as received from the supplier. In general solvent dyes are pure (>90%) and disperse dyes have purities in the range 20-50%.

A stock solution of 1.8 g/L of a base washing powder in water was created. The washing powder contained 18% NaLAS, 73% salts (silicate, sodium tri-poly-phosphate, sulphate, carbonate), 3% minors including perborate, fluorescer and enzymes, remainder impurities and water. The solution was divided into 100 ml aliquots and the dyes added from the ethanol solutions with rapid stirring to give 200 ppb solutions. 1 g of pure knitted polyester fabric was added to each of the wash solutions and the solution then shaken for 30 minutes, rinsed and dried. From the colour of the fabric it was clear that dye had deposited to the fabric. To quantify this the colour was measured using a reflectance spectrometer and expresses as the delta E value compared to a polyester washed analogously but without dye present. Following the washes the Ganz whiteness of the cloth was also measured (see "assessment of Whiteness and Tint of Fluorescent Substrates with Good Instrument Correlation" *Colour Research and Application* 19, 1994).

The experiments were repeated using knitted nylon as a fabric type.

The results are displayed in the table below.

| Dye<br>Maximum visible absorption<br>wavelength in ethanol given. | OD<br>10 cm | Ganz | ΔE<br>poly<br>ester | ΔE<br>nylon | CT |
|---|---|---|---|---|---|
| Control | 0 | 81 | 0.1 | 0.4 | — |
| 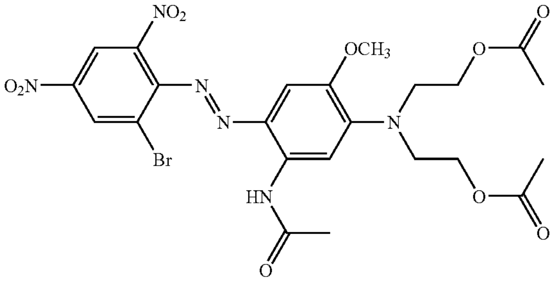<br>Disperse Blue 79:1 (576 nm)<br>LogP = 4.5 | 0.048 | 113 | 4.7 | 1.7 | 96 |
| 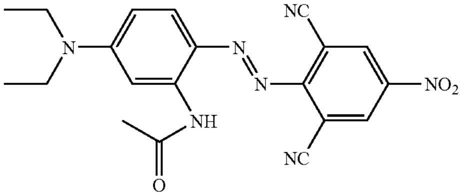<br>Disperse Blue 165 (611 nm)<br>LogP = 3.5 | 0.014 | 129 | 7.5 | 5.0 | 107 |
| Disperse Blue 367 (610 nm) | 0.0067 | 91 | 1.4 | 1.1 | 250 |
| Solvent blue 43<br>Triphenylmethane (602 nm) | 0.33 | 88 | 0.9 | 0.4 | 2.1 |

-continued

| Dye Maximum visible absorption wavelength in ethanol given. | OD 10 cm | Ganz | ΔE poly ester | ΔE nylon | CT |
|---|---|---|---|---|---|
| Lumogen F Blau 650 (ex BASF) | — | 88 | 0.3 | 0.6 | — |
| Lumogen F Violett 570 (ex BASF) | — | 87 | 0.1 | 0.2 | — |
| 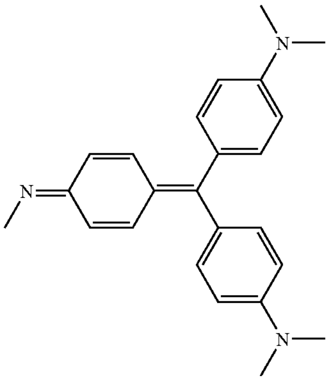 Solvent Violet 8 (Methyl Violet B Base) (580 nm) LogP = 4.5 | 0.26 | 89 | 1.1 | 0.6 | 3.5 |
| 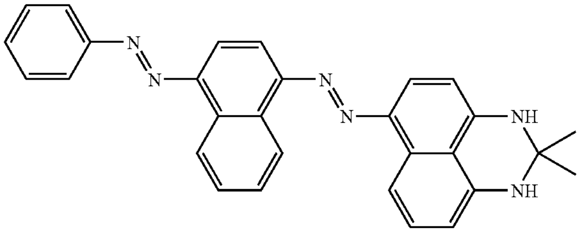 solvent black 3 (604 nm) logP = 8.5 | 0.11 | 74 | 1.5 | 0.6 | 6.4 |
| Dianix Violet CC (550 nm) (ex Dystar) | 0.013 | 132 | 8.0 | 7.5 | 623 |
| 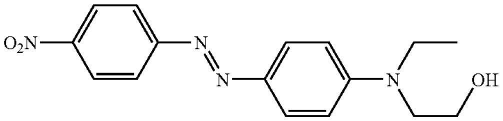 Disperse red 1 (482 nm) LogP = 4.0 | 0.023 | 71 | 3.4 | 11.8 | 150 |

Table—Notes

The ganz whiteness values are accurate to +/−5 units.

All deltaE measurements are UV excluded.

Only where known is the structure of the dye given.

The optical density, OD, is that of a 200 ppb solution in water at 10 cm. The value was obtained by extrapolated from from measurement in ethanol solutions at higher levels for accuracy.

CT is a measure of the Colour Transferred from the wash solution to the polyester and is defined as:

CT=deltaE/OD

From the deltaE results in the table all the dyes coloured the polyester.

From the Ganz results, dyes which are blue or violet increase the whiteness. The Black and red dyes decrease the whiteness.

The lumogen dyes add fluorescence to the polyester, as observed by eye in a light box with UV-irradiation.

Example 3

The experiment of example 2 was repeated, but using 40 ppb of the dyes listed below. The L:C was changed to 30:1 and consisted by weight of 43% woven polyester and 57% non-mercerised cotton sheeting. The Ganz whiteness of the polyester was 89 for disperse blue 79:1. Whiteness benefits were also observed on the cotton. Repetition of the experiment using nylon, also gave benefits.

We claim:

1. A laundry method of simultaneously washing and whitening a polyester-containing textile garment, the method comprising:

(a) treating under normal domestic wash conditions the textile garment with an aqueous solution comprising:

(i) from 1 ppb to 5 ppm of a hydrophobic dye, which is an azo dye, wherein the hydrophobic dye, when deposited onto the textile garment, provides a blue or violet shade to the garment that imparts a shading whiteness benefit thereto, and (ii) from 0.2 g/L to 3 g/L of a detersive surfactant, which is a mixture of at least one anionic surfactant and at least one nonionic surfactant, wherein the nonionic surfactant is present in an amount greater than 10 wt % of the total surfactant; and (b) rinsing and drying the textile garment, wherein (a) provides a simultaneous washing and shading whiteness benefit to the polyester-containing textile garment.

2. The laundry method according to claim 1, wherein the hydrophobic dye is a disperse or solvent dye.

3. The laundry method according to claim 1, wherein the hydrophobic dye is a mono-azo dye.

4. The laundry method according to claim 3, wherein the mono-azo dye is selected from a compound of the following formula:

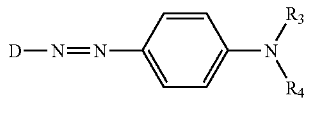

wherein $R_3$ and $R_4$ are optionally substituted $C_2$ to $C_{12}$ alkyl chains having optionally therein ether (—O—) or ester links, the chain being optionally substituted with —Cl, —Br, —CN, —$NO_2$, and —$SO_2CH_3$; and wherein D denotes an aromatic or heteroaromatic group.

5. The laundry method according to claim 4, wherein $R_3$ is —$CH_2CH_2R_5$, $R_4$ is —$CH_2CH_2R_6$, $R_5$ and $R_6$ are independently selected from the group consisting of H, —CN, —OH, —$C_6H_5$, —$OCOR_7$ and —$COOR_7$, and wherein $R_7$ is aryl or alkyl.

6. The laundry method according to claim 5, wherein $R_7$ is aryl and the aryl is —$C_6H_5$ or —$C_{10}H_7$.

7. The laundry method according to claim 4, wherein D is selected from the group consisting of thiophenes, benzothiazoles and pyridones.

8. The laundry method according to claim 3, wherein the mono-azo dye is a compound of the formula:

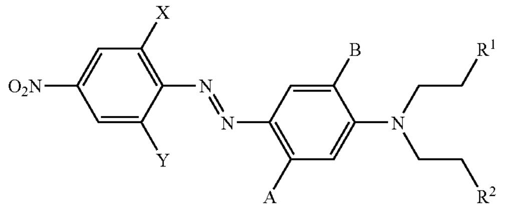

where X and Y are independently selected from the group consisting of H, —Cl, —Br, —CN, —$NO_2$, and —$SO_2CH_3$;

A is selected from the group consisting of H, —$CH_3$, —Cl, and —NHCOR;

B is selected from the group consisting of H, —$OCH_3$, —$OC_2H_5$, and —Cl;

$R^1$ and $R^2$ are independently selected from the group consisting of H, —CN, —OH, —OCOR, —COOR, and -aryl; and, R is $C_1$-$C_8$-alkyl.

9. The laundry method according to claim 1, wherein the hydrophobic dye is selected from the group consisting of (azo): Disperse blue 10, 11, 12, 21, 30, 33, 36, 38, 42, 43, 44, 47, 79, 79:1, 79:2, 79:3, 82, 85, 88, 90, 94, 96, 100, 101, 102, 106, 106:1, 121, 122, 124, 125, 128, 130, 133, 137, 138, 139, 142, 146, 148, 149, 165, 165:1, 165:2, 165:3, 171, 173, 174, 175, 177, 183, 187, 189, 193, 194, 200, 201, 202, 206, 207, 209, 210; 211, 212, 219, 220, 224, 225, 248, 252, 253, 254, 255, 256, 257, 258, 259, 260, 264, 265, 266, 267, 268, 269, 270, 278, 279, 281, 283, 284, 285, 286, 287, 290, 291, 294, 295, 301, 304, 313, 315, 316, 317, 319, 321, 322, 324, 328, 330, 333, 335, 336, 337, 338, 339, 340, 341, 342, 343, 344, 345, 346, 351, 352, 353, 355, 356, 358, 360, 366, 367, 368, 369, 371, 373, 374, 375, 376 and 378, Disperse Violet 2, 3, 5, 6, 7, 9, 10, 12, 13, 16, 24, 25, 33, 39, 42, 43, 45, 48, 49, 50, 53, 54, 55, 58, 60, 63, 66, 69, 75, 76, 77, 82, 86, 88, 91, 92, 93, 93:1, 94, 95, 96, 97, 98, 99, 100, 102, 104, 106 or 107, violet azo disperse dyestuff having a content of 40-50%, and dyes with CAS-No's 42783-06-2, 210758-04-6, 104366-25-8, 122063-39-2, 167940-11-6, 52239-04-0, 105076-77-5, 84425-43-4, and 87606-56-2.

10. The laundry method according to claim 1, wherein the laundry solution further comprises a fluorescer other than the hydrophobic dye.

11. The laundry method according to claim 1, wherein the hydrophobic dye is present in the range of from 10 ppb to 200 ppb.

12. The laundry method according to claim 1, wherein the aqueous solution has an ionic strength of from 0.001 to 0.5.

13. The laundry method according to claim 1, wherein the aqueous solution further comprises from 1 ppb to 6 ppm one or more cotton substantive shading dyes selected from the group consisting of hydrolysed reactive dye, acid dye and direct dye.

14. The laundry method according to claim 1, wherein the aqueous solution further comprises at least one enzyme.

15. A laundry method of simultaneously washing and whitening a polyester-containing textile garment, the method comprising:

(a) treating under normal domestic wash conditions the textile garment with an aqueous solution comprising:

(i) from 1 ppb to 5 ppm of a hydrophobic dye, which is an azo dye, wherein the hydrophobic dye, when deposited onto the textile garment, provides a blue or violet shade to the garment that imparts a shading whiteness benefit thereto, and (ii) from 0.2 g/L to 3 g/L of a detersive surfactant; and (b) rinsing and drying the textile garment, wherein (a) provides a simultaneous washing and shading whiteness benefit to the polyester-containing textile garment.

16. The laundry method according to claim 1, wherein the hydrophobic dye has a peak absorption wavelength from 550 nm to 650 nm.

17. The laundry method according to claim 15, wherein the hydrophobic dye has a peak absorption wavelength from 550 nm to 650 nm.

18. The laundry method according to claim 1, wherein the hydrophobic dye is present in the range of from 40 ppb to 5 ppm.

19. The laundry method according to claim 1, wherein the hydrophobic dye is present in the range of from 200 ppb to 5 ppm.

20. A laundry treatment composition for simultaneously washing and whitening a polyester-containing textile garment under normal domestic wash conditions, comprising:

(i) between 0.0001 to 0.1 wt % of a hydrophobic dye, which is an azo dye, wherein the hydrophobic dye, when deposited onto the textile garment, provides a blue or violet shade to the garment that imparts a shading whiteness benefit thereto, and (ii) between 2 and 60 wt % of a detersive surfactant, wherein the detersive surfactant is a mixture of at least one anionic surfactant and at least one nonionic surfactant, and (iii) at least one enzyme.

21. The laundry treatment composition according to claim 20, wherein the hydrophobic dye has a peak absorption wavelength from 550 nm to 650 nm.

22. The laundry treatment composition according to claim 20, wherein the hydrophobic dye is a mono-azo dye.

23. The laundry treatment composition according to claim 20, wherein the detersive surfactant is between 10 and 30 wt %.

24. The laundry treatment composition according to claim 20, wherein the nonionic surfactant is present in an amount greater than 10 wt % of the total surfactant.

25. The laundry treatment composition according to claim 20, further comprises a fluorescer other than the hydrophobic dye.

26. The laundry treatment composition according to claim 20, further comprising one or more cotton substantive shading dyes selected from the group consisting of hydrolysed reactive dye, acid dye and direct dye.

* * * * *